3,408,389
1-AMINOALKYL-AMINO-INDANES AND SALTS THEREOF

Jack Bernstein, New Brunswick, and Ervin R. Spitzmiller, Highland Park, N.J., and Herman A. Bruson, Woodbridge, Conn., assignors, by mesne assignments, to E. R. Squibb & Sons, Inc., New York, N.Y., a corporation of Delaware
No Drawing. Filed July 27, 1964, Ser. No. 385,458
5 Claims. (Cl. 260—501.2)

This invention relates to new chemical compounds, and more particularly, to compounds of the Formula I:

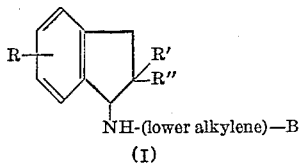

NH-(lower alkylene)—B
(I)

and pharmaceutically acceptable acid-addition and quaternary ammonium salts thereof, wherein R is hydrogen, lower alkyl (e.g., methyl, ethyl and isopropyl), halogen (e.g., bromine, chlorine and fluorine), halomethyl (e.g., trifluoromethyl), lower alkoxy (e.g., methoxy, ethoxy, propoxy and amyloxy), aryloxy (e.g., phenoxy), or di-(lower alkyl)amino (e.g., dimethylamino and diethylamino); R' and R" each represents lower alkyl (e.g., methyl, ethyl and isopropyl); monocyclic aryl (e.g., phenyl and o, m, and p-tolyl); halophenyl; halomethylphenyl (e.g., m-trifluoromethylphenyl); lower alkoxyphenyl (e.g., m-methoxyphenyl); monocyclic aryl (lower alkyl) (e.g., benzyl, phenethyl, and β-phenylpropyl); and halo, halomethyl, and lower alkoxy substituted monocyclic aryl (lower alkyl) and B is a basic, nitrogen-containing radical such as amino, (lower alkyl) amino, di(lower alkyl)amino (e.g., dimethylamino and diethylamino), hydroxy(lower alkyl)amino, di[hydroxy(lower alkyl)]-amino, halo(lower alkyl)amino, di[hydroxy(lower alkyl)]amino, (lower alkyl)aralkylamino, aralkylamino (e.g., benzylamino), piperidyl (e.g., piperidino), (lower alkyl) piperidyl (e.g., 2, 3 and 4-methylpiperidino), di-(lower alkyl) piperidyl (e.g., 2,4-, 2,6- and 3,5-dimethylpiperidino); homopiperidyl; pyrrolidyl (e.g., pyrrolidino), (lower alkyl)pyrrolidyl, di(lower alkyl)-pyrrolidyl, piperazinyl (e.g., piperazino), homopiperazinyl, (lower alkyl) piperazinyl (e.g., N⁴-methylpiperazino), di(lower alkyl)piperazinyl, (lower alkoxy) piperazinyl, arylpiperazinyl (e.g., R-substituted phenylpiperazino, such as 4-phenylpiperazino), aralkylpiperazinyl (e.g., R-substituted phenyl(lower alkyl)-piperazino), such as benzylpiperazino and p - chlorophenethyl - piperazino, pyridylpiperazinyl [e.g., 4-(3-pyridyl)piperazino], pyridyl(lower alkyl)piperazinyl [e.g., 4-(3-pyridylmethyl)-piperazino], (alkanoyl-lower alkyl)piperazinyl [e.g., 4-(2-acetoxyethyl) piperazino], (hydroxy-lower alkyl)piperazinyl [e.g., 4-(2-hydroxyethyl)piperazino], homopiperazinyl, morpholinyl (e.g., morpholino), (lower alkyl)morpholinyl, di(lower alkyl)morpholinyl, thiamorpholinyl (e.g., thiamorpholino), (lower alkyl)thiamorpholinyl and di(lower alkyl)-thiamorpholinyl. The terms "lower alkyl," "lower alkoxy," and "lower alkylene" as employed herein, include both straight and branched chain radicals of less than eight carbon atoms.

The preferred compounds of this invention are those of Formula I in which R is hydrogen, R' is methyl and R" is methyl or phenyl, lower alkylene is ethylene or isopropylene, and B is dimethylamino or N-methyl-N-phenethylamino.

Examples of suitable acid-addition salts of the free bases of this invention include the mineral acid salts, such as the hydrohalides e.g. hydrochloride, hydrobromide and hydroiodide), the sulfate and the phosphate; and organic acid salts, such as the citrate, tartrate, oxalate, ascorbate, acetate and succinate. Pharmacologically acceptable acids are, of course, employed where the salt form is prepared for therapeutic use.

Examples of suitable quaternary ammonium salts of the free bases of this invention include the lower alkyl halides (e.g., methyl chloride and methyl bromide), the lower alkyl sulfates (e.g., methosulfate), the aralkyl halides (e.g., benzyl chloride) and the aralkyl sulfates.

The compounds of this invention are physiologically active substances having analgetic activity. The compounds of this invention can be administered perorally to produce analgesia in the usual perorally acceptable forms, such as tablets and capsules, the dosage for such treatment being adjusted for the activity of the particular compound employed.

The compounds of this invention are prepared by the process of this invention which comprises reacting a compound of the Formula II:

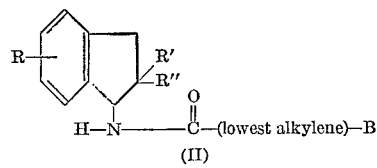

wherein R, R', R" and B are as hereinbefore defined, with a reducing agent such as lithium aluminum hydride to yield the bases of Formula I. The bases can then be converted to either their acid-addition salts or quaternary ammonium salts in the usual manner by treatment with the desired acid or quaternizing agent.

Compounds of the Formula II can be prepared as described in our application, Serial No. 385,454, filed on even date herewith and now abandoned.

The following examples illustrate the invention (all temperatures being in centigrade):

EXAMPLE 1.—N,N-DIMETHYL-N'-(CIS-2-METHYL-TRANS - 2 - PHENYLINDAN - 1 - YL) - ETHYL-ENEDIAMINE DIHYDROCHLORIDE

A solution of 10 g. (0.032 mole) of 2-(dimethylamino) - N - (2 - methyl - 2 - phenylindan - 1 - yl)acetamide in 200 ml. anhydrous ether is added to a suspension of 3 g. (0.076 mole) of lithium aluminum hydride in 300 ml. of ether. Following the addition (30 minutes), the reaction mixture is warmed with stirring at reflux temperature for 12 hours. After cooling 9 ml. of water is added followed by a solution of 2 g. of sodium hydroxide in 10 ml. of water. The ethereal solution is decanted and the solid residue is washed with ether. After drying over magnesium sulfate and filtration the basic ethereal solution is cooled in an ice-water bath and 16 ml. of 4 N alcoholic hydrogen chloride (0.064 mole) is added. The gum which separates from solution readily crystallizes and is collected by suction filtration. The solid, about 10 g. (85%), is recrystallized from ethanol-ether followed by recrystallization from methyl ethyl ketone with a recovery of about 5 g. of product (42%), M.P. about 205–207°.

*Analysis.*—Calcd. for $C_{20}H_{26}N_2 \cdot 2HCl$: N, 7.62; Cl, 19.39. Found: N, 7.77; Cl, 19.66.

Similarly, by substituting the following 2-(dimethylamino) - N - (2,2 - R',R" - substituted - indan-1-yl)acetamides for the 2-(dimethylamino)-N-(2-methyl-2-phenylindan-1-yl)acetamide in the procedure of Example 1, the indicated N,N-dimethyl-N'-(2,2-R',R"-substituted-indan-1-yl)ethylenediamine dihydrochloride is formed:

| Example | Reactant | | Product Formed | |
|---|---|---|---|---|
| | R' is | R" is | R' is | R" is |
| 2 | Methyl | Methyl | Methyl | Methyl. |
| 3 | do | Ethyl | do | Ethyl. |
| 4 | Phenyl | p-Tolyl | Phenyl | p-Tolyl. |
| 5 | Methyl | o-Chlorophenyl | Methyl | o-Chlorophenyl. |
| 6 | do | p-Trifluoromethylphenyl | do | p-Trifluoromethylphenyl. |
| 7 | Ethyl | m-Methoxyphenyl | Ethyl | m-Methoxyphenyl. |
| 8 | Methyl | m-Bromophenyl | Methyl | m-Bromophenyl. |
| 9 | do | Benzyl | do | Benzyl. |
| 10 | Ethyl | β-Phenethyl | Ethyl | β-Phenethyl. |

EXAMPLE 11.—N,N-DIMETHYL - N' - (CIS-2-METHYL - TRANS - 2 - PHENYL - 5 - CHLOROINDAN-1 - YL)ETHYLENEDIAMINE DIHYDROCHLORIDE

Following the procedure of Example 1, but substituting 2 - (dimethylamino) - N - (2 - methyl-2-phenyl-5-chloroindan-1-yl)-acetamide for the 2-(dimethylamino)-N-(2-methyl-2-phenylindan-1-yl)-acetamide, N,N-dimethyl-N'-(cis-2-methyl-trans-2-phenyl - 5 - chloroindan-1-yl)ethylenediamine dihydrochloride is formed.

Similarly, by substituting the following 2-(dimethylamino)-N-(2-methyl - 2 - phenyl - R - substituted-indan-1-yl)acetamides for the 2-(dimethylamino)-N-(2-methyl-2-phenylindan-1-yl)acetamide in the procedure of Example 1, the indicated N,N-dimethyl-N'-(cis-2-methyl-trans-2-phenyl - R - substituted - indan - 1 - yl)ethylenediamine hydrochloride is formed:

| Example | Reactant R is | Product Formed R is |
|---|---|---|
| 12 | 4-methyl | 4-methyl. |
| 13 | 6-isopropyl | 6-isopropyl. |
| 14 | 5-trifluoromethyl | 5-trifluoromethyl. |
| 15 | 7-methoxy | 7-methoxy. |
| 16 | 4-chloro | 4-chloro. |
| 17 | 5-bromo | 5-bromo. |
| 18 | 5-dimethylamino | 5-dimethylamino |

EXAMPLE 19.—2,N,N - TRIMETHYL - N' - (CIS-2-METHYL - TRANS - 2 - PHENYLINDAN - 1 - YL) ETHYLENEDIAMINE DIHYDROCHLORIDE

Following the procedure of Example 1, but substituting 2 - (dimethylamino) - N - (2 - methyl-2-phenylindan-1-yl)propionamide for the acetamide, 2,N,N-trimethyl-N'-(cis - 2 - methyl - trans - 2 - phenylindan - 1 - yl)ethylenediamine dihydrochloride is formed.

Similarly by substituting any other dimethylamino-N-(2-methyl-2-phenylindan-1-yl) (lower alkanoyl)amide for the acetamide in Example 1, the corresponding N,N-dimethyl-N'-(cis-2-methyl-trans-2-phenylindan-1-yl) (lower alkylene)diamine dihydrochloride is formed.

EXAMPLE 20.—N - 2 - (CIS - 2 - METHYL - TRANS-2 - PHENYLINDAN - 1 -YLAMINO)ETHYL - N'-METHYLPIPERAZINE DIHYDROCHLORIDE

Following the procedure of Example 1, but substituting 2 - (N - methylpiperazino) - N - (cis - 2 - methyl-trans-2-phenylindan-1-yl)-acetamide hydrochloride for the acetamide used in the example, N,2-(cis - 2 - methyl-trans-2-phenylindan - 1 - ylamino)ethyl - N' - methylpiperazine dihydrochloride is obtained.

Similarly by substituting the following 2 - B - N - (2-methyl-2-phenylindan-1-yl)acetamides for the acetamide in the procedure of Example 1, the indicated N-2-(cis-2-methyl - trans-2-phenylindan-1-ylamino)ethyl-B dihydrodihydrochloride is obtained.

| Example | Reactant B is— | Product formed B is— |
|---|---|---|
| 21 | Methylamino | N'-methylamine. |
| 22 | Diethylamino | N',N'-diethylamine. |
| 23 | Benzylamino | N'-benzylamine. |
| 24 | Piperidino | Piperidine. |
| 25 | Pyrrolidino | Pyrrolidine. |
| 26 | Homopiperidino | Homopiperidine. |
| 27 | N-phenylpiperazino | N'-phenylpiperazine. |
| 28 | N-(2-hydroxyethyl)piperazino | N'-(2-hydroxyethyl)piperazine. |
| 29 | Homopiperazino | Homopiperazine. |
| 30 | Morpholino | Morpholine. |
| 31 | Thiamorpholino | Thiamorpholine. |
| 32 | Methylphenethylamino | N'-methylphenethylamine. |

EXAMPLE 33.—N,N - DIMETHYL - N' - (CIS - 2-METHYL - TRANS - 2 - PHENYLINDAN - 1 - YL)-ETHYLENEDIAMINE METHOCHLORIDE

A solution of 150.0 g. of material from Example 1 in 100 ml. of acetonitrile is cooled and treated with 25 g. of methyl chloride. After standing for several days at room temperature, the solution is diluted to 300 ml. with ether to give the methochloride.

The invention may be variously otherwise embodied within the scope of the appended claims.

What is claimed is:

1. A compound selected from the group consisting of

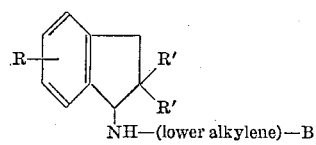

and the pharmaceutically acceptable acid-addition and quaternary ammonium salts thereof, wherein R is selected from the group consisting of hydrogen, lower alkyl, bromine, chlorine, fluorine, trifluoromethyl, lower alkoxy, phenyloxy and di(lower alkyl)-amino; R' and R" each is selected from the group consisting of lower alkyl, monocyclic aryl, chlorophenyl, bromophenyl, trifluoromethylphenyl, lower alkoxyphenyl, monocyclic aryl(lower alkyl), and lower alkoxy substituted monocyclic aryl (lower alkyl); and B is selected from the group consisting of amino, (lower alkyl)amino, di(lower alkyl) amino, hydroxy(lower alkyl)amino, di[hydroxy(lower alkyl)]amino, (lower alkyl)aralkylamino of from 6 to 12 carbon atoms and aralkylamino of from 6 to 12 carbon atoms.

2. N,N - di(lower alkyl) - N' - (2 - methyl-2-phenyl-indan-1-yl)-(lower alkylene)diamine.

3. A pharmaceutically acceptable salt of the compound of claim 2.

4. N,N - dimethyl - N' - (cis-2-methyl-trans-2-phenyl-indan-1-yl)-ethylenediamine.

5. A pharmaceutically acceptable salt of the compound of claim 4.

References Cited

UNITED STATES PATENTS

| | | | |
|---|---|---|---|
| 2,670,371 | 2/1954 | Cusic | 260—557 |
| 2,916,490 | 12/1959 | Schenck et al. | 260—570.5 XR |

FOREIGN PATENTS 955,497 1/1957 Germany.

CHARLES B. PARKER, *Primary Examiner.*

ROBERT V. HINES, *Assistant Examiner.*